N. Harper.
Combined Rake and Hoe.
N° 90,448. Patented May 25, 1869.
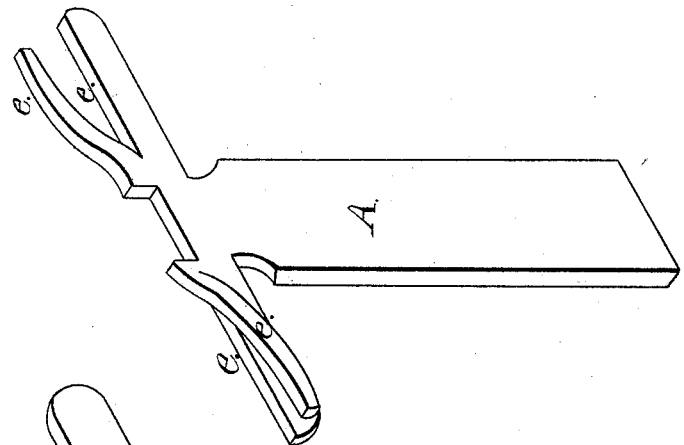
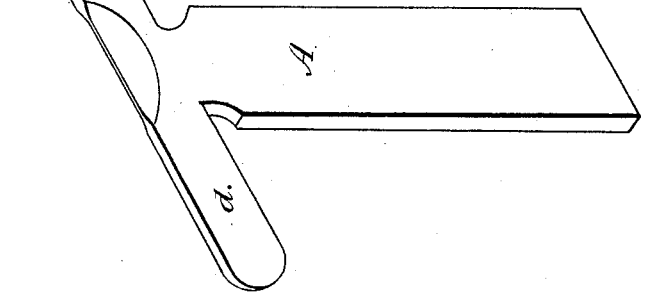
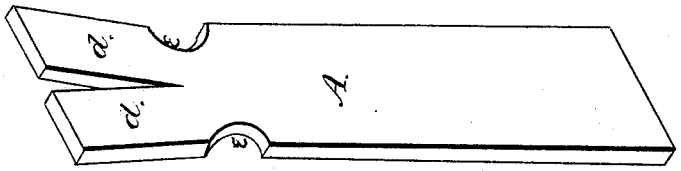
Witnesses:
A. M. Tanner
C. A. Pettit
Inventor:
N. Harper
by Munn & Co
Attorneys

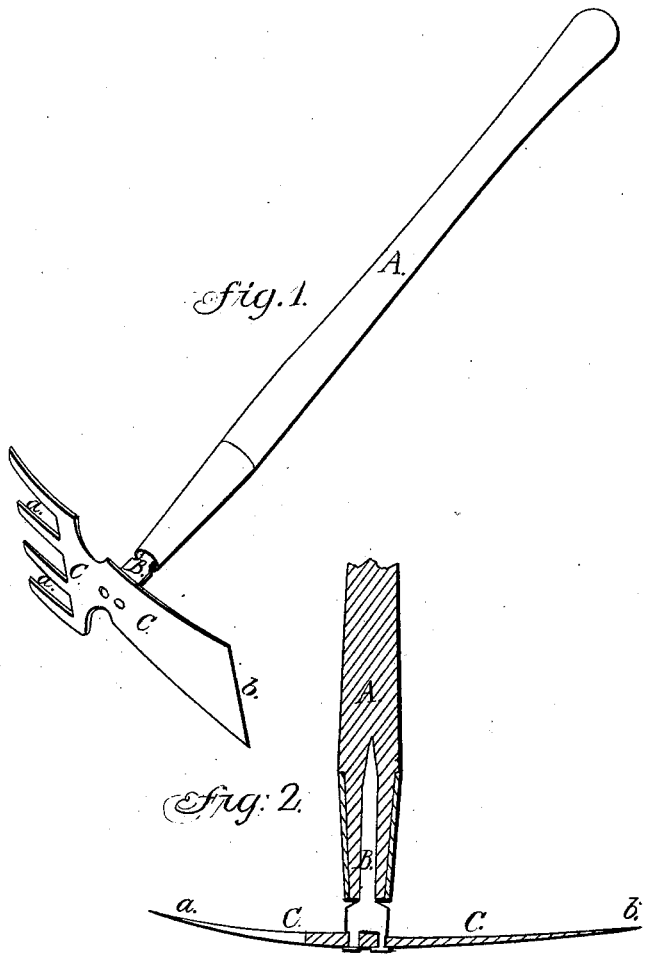

United States Patent Office.

NATHAN HARPER, OF PHILADELPHIA, PENNSYLVANIA.

Letters Patent No. 90,448, dated May 25, 1869.

IMPROVED BLANK FOR RAKE AND HOE COMBINED.

The Schedule referred to in these Letters Patent and making part of the same.

*To all whom it may concern:*

Be it known that I, NATHAN HARPER, of the city of Philadelphia, in the county of Philadelphia, and State of Pennsylvania, have invented a new and improved Combined Rake and Hoe; and I do hereby declare that the following is a full, clear, and exact description thereof, which will enable others skilled in the art to make and use the same, reference being had to the accompanying drawing, forming part of this specification, in which—

Figure 1 represents a perspective view of my improved combined rake and hoe.

Figure 2 is a sectional view of the same.

Figures 3, 4, and 5, sheet 2, are perspective views of the hoe and rake-blank, showing the various stages of construction.

Similar letters of reference indicate corresponding parts.

This invention relates to a new manner of constructing a combined rake and hoe, by forming the same of a single piece of metal.

Heretofore combined hoes and rakes were made by welding a piece of metal, for the rake, to the hoe, whereby less reliable and strong tools were produced.

A, in fig. 1 of the drawing, represents the handle, B, the shank, and C, the blade of my improved agricultural implement.

The plate is provided with a suitable number of prongs, or teeth, *a a*, at one end, to form a rake, and with a continuous cutting-edge, *b*, at the other end, to form a hoe.

In constructing my improved hoe and rake, a bar of metal, A, fig. 3, is formed, of the proper length and thickness, with one end split to produce two arms, *d*, which are then drawn out, by any suitable means, at right angles to the part A, as shown in fig. 4.

The arms *d d* are then divided longitudinally a portion of their length, as shown at *e e*, fig. 5, and bent to form the teeth of the rake.

After the blank has been thus treated, it is rolled by the ordinary process, the part A, in figs. 3, 4, and 5, forming the blade C, figs. 1 and 2, of the hoe, and the portions *e e* producing the rake-teeth *a*, as shown.

The shank is either riveted to the blade, as shown, or otherwise attached.

I do not claim the manner of forming the teeth of the rake, nor the manner of attaching the shank to the blade or handle; nor do I confine myself to any material from which either part is made; but

What I claim as new, and desire to secure by Letters Patent, is—

The method, herein described, of forming a combined hoe and rake from one piece of metal, for the purpose specified.

NATHAN HARPER.

Witnesses:
 EDWIN SATTERTHWAIT,
 JAMES SATTERTHWAIT.